United States Patent [19]

Fuji et al.

[11] Patent Number: 5,530,086
[45] Date of Patent: Jun. 25, 1996

[54] POLYESTER CONTAINING 9,9-BIS(4-(2-HYDROXYALKOXY)PHENYL FLUORENE

[75] Inventors: Michiaki Fuji, Toyonaka; Kenji Yao, Osaka; Koei Igarashi, Osaka; Toshihiro Kushimoto, Osaka, all of Japan

[73] Assignee: Kanebo, Ltd., Tokyo, Japan

[21] Appl. No.: 374,737

[22] PCT Filed: Jul. 29, 1993

[86] PCT No.: PCT/JP93/01078

§ 371 Date: Jan. 25, 1995

§ 102(e) Date: Jan. 25, 1995

[87] PCT Pub. No.: WO94/03521

PCT Pub. Date: Feb. 17, 1994

[30] Foreign Application Priority Data

Jul. 30, 1992 [JP] Japan ..................................... 4-224626
Jul. 30, 1992 [JP] Japan ..................................... 4-224628

[51] Int. Cl.[6] .................................................. C08G 63/00
[52] U.S. Cl. ........................ 528/193; 528/176; 528/190; 528/194; 264/176.1; 264/209.1; 428/480
[58] Field of Search ..................... 528/176, 190, 528/193, 194; 428/480; 264/176.1, 209.1

[56] References Cited

U.S. PATENT DOCUMENTS

| | | | |
|---|---|---|---|
| 4,387,209 | 6/1983 | Rieder et al. | 528/176 |
| 4,967,306 | 10/1990 | Hampl, Jr. et al. | 361/323 |
| 5,093,461 | 3/1992 | Herrscher | 528/219 |

FOREIGN PATENT DOCUMENTS

| | | |
|---|---|---|
| 62-292830 | 12/1987 | Japan . |
| 63-39163 | 2/1988 | Japan . |
| 63-152622 | 6/1988 | Japan . |
| 1-194904 | 8/1989 | Japan . |
| 4-22931 | 4/1992 | Japan . |

*Primary Examiner*—James J. Seidleck
*Assistant Examiner*—Terressa Mosley
*Attorney, Agent, or Firm*—Flynn, Thiel, Boutell & Tanis

[57] ABSTRACT

Provided is a polyester from 9,9-bis[4-(2-hydroxyethoxy)phenyl]fluorenes as a diol component, and this novel polymer is excellent in transparency and heat resistance, has small optical anisotropy, is excellent in moldability, dimensional stability and chemical resistance and is industrially suitable for use in the fields of optical materials, fibers, films and sheets.

7 Claims, 1 Drawing Sheet

POLYESTER CONTAINING 9,9-BIS(4-(2-HYDROXYALKOXY)PHENYL FLUORENE

This application is a continuation of application of PCT/5P93/01078 filed Jul. 29, 1993.

TECHNICAL FILED

The present invention relates to a polyester. More specifically, it relates to a copolyester which contains a copolymer unit derived from 9,9-bis[4-(2hydroxyethoxy)phenyl]-fluorenes and which is excellent in transparency and heat resistance, has small optical anistropy, is excellent in moldability and is suitable as a material not only for engineering plastics but also for optical equipments in particular.

TECHNICAL BACKGROUNDS

In recent years, a variety of components have been copolymerized, or polymers have been produced as wholly aromatic polymers such as polyarylate, for improving heat resistance of polyesters. A polyester from 9,9-bis(4-hydroxyphenyl)fluorene has been also proposed, while no proposal has been made for a copolyester from 9,9-bis[4-(2-hydroxyethoxy)phenyl]fluorene.

That is, U.S. Pat. No. 3,546,165 discloses that a polymer from 9,9-bis(4-hydroxyphenyl)fluorene, terephthalic acid and isophthalic acid is obtained by an acid chloride method thereof. For improving this polymer in moldability, Japanese Patent Publication No. 22,931/1992 discloses a heat-resistant polyester from a mixture prepared by mixing 9,9-bis(4-hydroxyphenyl)fluorene with terephthalic acid, isophthalic acid and a fatty acid in a specific mixing ratio. Further, Japanese Laid-open Patent Publication No. 152,622/1988 discloses a process for producing a soluble, heat-resistant polyarylate, and Japanese Laid-open Patent Publications Nos. 192432/1982 and 292830/1987 disclose raw materials having a specific viscosity for copolymers from mixtures of 9,9-bis(4-hydroxyphenyl)fluorene with terephthalic acid and isophthalic acid in specific mixing ratios. Further, a polyester from a mixture of this 9,9-bis(4-hydroxyphenyl)fluorene with terephthalic acid, isophthalic acid and an aliphatic dicarboxylic acid is also disclosed.

However, for all the above polymers, 9,9-bis(4-hydroxyphenyl)fluorene is used as one of raw materials, and the polymerization method therefor requires special polymerization conditions. That is, differing from an aliphatic alcohol, 9,9-bis(4-hydroxyphenyl)fluorene is difficult to react due to a phenolic hydroxyl group on each terminal thereof. Hence, in the melt polymerization method, reaction conditions at higher temperatures are required, and a polymer formed is likely to undergo thermal decomposition to cause coloring and degradation in quality. Further, it is generally said that, in a polymerization method in which a dicarboxylic acid is converted to an acid chloride and then hydrochloric acid is removed in a solvent, it is difficult to proceed with a uniform reaction, and that a polymer having a large molecular weight distribution is obtained. It is also required to post-treat a compound of a catalyst which is required in a large amount. Thus, the production method is complicated, and additional costs are required. Further, in spite of various improvements, the material obtained has too high a glass transition point, and injection-molding thereof is difficult. Therefore, it cannot be said that the moldability thereof has been satisfactory.

Transparent resins having excellent mechanical properties are conventionally used as an engineering plastic in the filed of optical materials. For example, polymethyl methacrylate (to be abbreviated as PMMA hereinafter), polycarbonate (to be abbreviated as PC hereinafter) and noncrystalline polyolefin and the like are used as optical materials for a compact disk, a laser disk and a lens or as materials for transparent parts of automobiles. However, the problems with these resins are that they have low heat resistance, that they show high moisture absorption and have poor stability in form, and that they have stress strain or molecular orientation in heat molding such as in injection molding to give a product having a high birefringence, or the materials therefor are very expensive. It therefore cannot be said that the above resins are fully satisfactory. In recent years, further, with prompt developments of optical disks using laser light to record and reproduce information such as voices, images and characters, it is desired to develop substrate materials having higher-performance optical properties.

The present inventors have made diligent studies in view of the above prior art defects and completed the present invention by finding a polyester having a specific structure. The object of the invention is to provide a copolyester which is excellent in transparency and mechanical and electrical properties and which has sufficient heat resistance in practical use.

It is another object of the present invention to provide a copolyester which has small optical anistropy, is excellent in moldability and dimensional stability and is suitable for an engineering plastic, particularly as an optical material.

It is further another object of the present invention to provide a copolyester which can be industrially-easily produced at a low cost; and a molded article therefrom.

DISCLOSURE OF THE INVENTION

According to the present invention, the above objects and advantages are achieved by a polyester which is produced from an aromatic dicarboxylic acid as a main acid component, and a dihydroxy compound of the following formula (1), wherein $R_1$ is an alkylene group having 2 to 4 carbon atoms, and each of $R_2$, $R_3$, $R_4$ and $R_5$ is independently a hydrogen atom, an alkyl group having 1 to 4 carbon atoms, an aryl group or an aralkyl group,
and an aliphatic glycol having 2 to 4 carbon atoms as main glycol components, and which has an intrinsic viscosity, measured in a phenol/tetrachloroethane mixed solvent at 20° C., of at least 0.3.

DETAILED DISCLOSURE OF THE INVENTION

It is a key to the present invention that the above polyester contains as a copolymer unit a dihydroxy compound of the above general formula (1), and it has been found in the present invention that, since it is contained, a polyethylene terephthalate resin can be improved in heat resistance, and the optical anisotropy thereof can decreased, without impairing the moldability of the polyethylene terephthalate resin. The optical anistropy is considered to be decreased by the special structure of the dihydroxy compound of the formula (1), i.e., a structure in which a fluorene group is arranged on a perpendicular plane with regard to the direction of the main chain in which two phenol groups belong, although the reason therefor is not clear. That the optical anisotropy is small can be known by measuring the birefringence of a molded article obtained by molding a polymer material. For example, concerning the birefringence of an optical disk substrate in a perpendicular direction and the birefringence thereof at an inclined angle, Japanese Laid-open Patent Publication No. 39,163/1988 details the principles and measurement methods thereof, and it has been found that the polyester of the present invention shows an effect on remarkably decreasing a difference between these birefringences. That the above difference is small is an important factor for forming an optical disk substrate which is a high-density recording medium, an opto-magnetic disk in particular, and the C/N ratio (C is a carrier: recorded signal, and N is a noise) of a formed recording medium can be decreased.

Further, the polyester of the present invention has an intrinsic viscosity of at least 0.3, preferably 0.4 to 0.8, when measured in a mixed solvent of 60% by weight of phenol and 40% by weight of 1,1,2,2-tetrachloroethane at 20° C. When the intrinsic viscosity is less than 0.3, a molded article from the polyester shows insufficient mechanical strength. However, when the intrinsic viscosity is at least 3, a molded article having sufficient mechanical strength can be obtained. The larger the intrinsic viscosity is, the more easily the stress strain and molecular orientation takes place in the molding step, and for this reason, a molded article is liable to have a larger birefringence. It is therefore preferred to use a polyester having a low intrinsic viscosity, an intrinsic viscosity of 0.35 to 0.55, for forming, e.g., an optical disk substrate, while it is preferred to use a polyester having a high intrinsic viscosity, an intrinsic viscosity of 0.6 to 0.8, for blow molding. That is, a polyester having a proper intrinsic viscosity can be selected as required depending upon use. A polyester having a desired intrinsic viscosity can be easily obtained by adjusting polymerization conditions such as a molecular weight adjuster, a polymerization time and a polymerization temperature.

Examples of the aromatic dicarboxylic acid constituting the polyester of the present invention include terephthalic acid, isophthalic acid, 2,6-naphthalenedicarboxylic acid, 1,8-naphthalenedicarboxylic acid, 1,4-naphthalenedicarboxylic acid, 1,2-naphthalenedicarboxylic acid, 1,3-naphthalenedicarboxylic acid, 1,5-naphthalenedicarboxylic acid, 1,6-naphthalenedicarboxylic acid, 1,7-naphthalenedicarboxylic acid, 2,3-naphthalenedicarboxylic acid, 2,7-naphthalenedicarboxylic acid, 2,2'-biphenyldicarboxylic acid, 3,3'-biphenyldicarboxylic acid, 4,4'-biphenyldicarboxylic acid, and 9,9-bis(4-carboxyphenylene)fluorene. These are used alone or in combination as monomer(s) for a polymer unit.

Of the above dicarboxylic acids, preferred are terephthalic acid, isophthalic acid, 2,6-naphthalenedicarboxylic acid and 4,4'-biphenyldicarboxylic acid. In particular, terephthalic and isophthalic acid are further preferred in view of optical properties.

Further, as a comonomer for a subsidiary polymer unit, at least one of aliphatic dicarboxylic acids such as maleic acid, adipic acid, sebacic acid and decamethylenedicarboxylic acid may be used in an amount of up to 10 mol % based on the total of acid components, as required.

The dihydroxy compound constituting the polyester of the present invention is represented by the above formula (1). In the above formula (1), $R_1$ is an alkylene group having 2 to 4 carbon atoms, and each of $R_2$, $R_3$, $R_4$ and $R_5$ is independently a hydrogen atom, an alkyl group having 1 to 4 carbon atoms, an aryl group or an aralkyl group.

The alkylene group having 2 to 4 carbon atoms may be linear or branched, and examples thereof include ethylene, trimethylene, propylene and butylene groups.

The alkyl group having 1 to 4 carbon atoms may be linear or branched, and examples thereof include methyl, ethyl, n-propyl, iso-propyl and n-butyl groups.

As the aryl group, for example, a phenyl group is preferred. As the aralkyl group, for example, benzyl and phenylethyl groups are preferred.

Examples of the dihydroxy compound of the above general formula (1) includes;

9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3,5-dimethylphenyl]fluorene, 9,9-bis[4-(2-hydroxyethoxy)-3-ethylphenyl]fluorene, 9,9-bis[4-(2-hydroxyethoxy)-3,5-diethylphenyl]fluorene, 9,9-bis[4-(2-hydroxyethoxy)-3-propylphenyl]fluorene, 9,9-bis[4-(2-hydroxyethoxy)-3,5-dipropylphenyl]fluorene, 9,9-bis[4-(2-hydroxyethoxy)-3-isopropylphenyl]fluorene, 9,9-bis[4-(2-hydroxyethoxy)-3,5-diisopropylphenyl]fluorene, 9,9-bis[4-(2-hydroxyethoxy)-3-n-butylphenyl]fluorene, 9,9-bis[4-(2-hydroxyethoxy)-3,5-di-n-butylphenyl]fluorene, 9,9-bis[4-(2-hydroxyethoxy)-3-isobutylphenyl]fluorene, 9,9-bis[4-(2-hydroxyethoxy)-3,5-diisobutylphenyl]fluorene, 9,9-bis[4-(2-hydroxyethoxy)-3-(1-methylpropyl)phenyl]fluorene, 9,9-bis[4-(2-hydroxyethoxy)-3,5-bis(1-methylpropyl)phenyl]fluorene, 9,9-bis[4-(2-hydroxyethoxy)-3-phenylphenyl]fluorene, 9,9-bis[4-(2-hydroxyethoxy)-3,5-diphenylphenyl]fluorene, 9,9-bis[4-(2-hydroxyethoxy)-3-benzylphenyl]fluorene, 9,9-bis[4-(2-hydroxyethoxy)-3,5-dibenzylphenyl]fluorene, 9,9-bis[4-(3-hydroxypropoxy)phenyl]fluorene, and 9,9-bis[4-(4-hydroxybutoxy)phenyl]fluorene. These are used alone or in combination of at least two of them.

Of these, preferred is 9,9-bis[4-(2-hydroxyethoxy)phenyl]fluorene in view of optical properties of a polyester to be obtained and moldability.

The 9,9-bis[4-(2-hydroxyethoxy)phenyl]fluorene is obtained, for example, by adding ethylene oxide (hereinafter "EO") to 9,9-bis(4-hydroxyphenyl)fluorene. In this case, in addition to a 2EO adduct (9,9-bis[4-(2-hydroxyethoxy)phenyl]fluorene) in which one ethylene oxide molecule is added to each hydroxyl group of phenols, impurities which are adducts with one or a few EO molecules in excess, such as a 3EO adduct, a 4EO adduct, etc., are sometimes contained. With an increase in the amount of the impurities such as 3EO, 4EO, etc., the heat resistance of the polyester is decreased. The purity in terms of a 2EO adduct content is preferably at least 85%, more preferably at least 95%.

In the present invention, examples of the aliphatic glycol include glycols such as ethylene glycol, 1,3-propanediol, 1,2-propanediol, 1,4-butanediol, 1,2-butanediol, 1,3-butanediol, 1,5-pentanediol, 1,4-pentanediol and 1,3-pentanediol, and alicyclic dimethanols such as cyclohexanedimethanol and cyclopentanedimethanol. Above all, ethylene glycol and 1,4-butylene glycol are preferred, and in particular, ethylene glycol is preferred in view of the heat resistance of a polymer to be obtained. These may be used alone or in combination of two or more.

Further, at least one of dihydroxy compounds whose main chain and side chain have an aromatic ring, such as 1,1-bis [4-(2-hydroxyethoxy)phenyl]-1-phenylethane, compounds whose main chain has an aromatic ring and sulfur, such as bis[4-(2-hydroxyethoxy)phenylsulfone, and other dihydroxy compounds may be, as required, used in combination in an amount of up to 10 mol % based on the total of diol components.

The polyester of the present invention can be produced by any proper method selected from known methods such as a melt polymerization method, a solution polymerization method and an interfacial polymerization method, e.g., an ester exchange method and a direct polymerization method. Further, the reaction conditions therefor, such as a polymerization catalyst, may be set in a conventional manner according to a known method.

Meanwhile, when a solution polymerization method or an interfacial polymerization method is employed for producing the polyester of the present invention, generally, acid chloride is used as an active species which is an acid component, or a solvent such as methylene chloride and chloroform is used. In this case, a polymer contains residual chloride and catalyst compound which are byproducts. These residual byproducts are generally undesirable in view of a product quality, and it is therefore required to remove them after the polymerization step. Therefore, these byproducts degrade the workability in a step of forming a sheet, a film, a plate or a fiber, and give a molded article having a degraded quality. For example, in heating at a high temperature, thermal decomposition takes place in a large amount. For use as an optical material, a thin metal film such as a reflection film or a recording film is attached and fixed onto a plate or a substrate by a method such as a vapor deposition or a sputtering method. When, however, a chlorine content is present in a large amount, the chlorine content corrodes the reflection film or the recording film to decrease the life and reliability of the product. It is therefore required to employ a step of fully washing and/or filtering for removing foreign matter.

The polyester of the present is excellent especially when produced by a melt polymerization method. That is, compounds of 9,9-bis[4-(2-hydroxyethoxy)phenyl]fluorenes have high reactivity since terminal groups of the compounds have properties quite similar to those of aliphatic glycols. This point is remarkably different as compared with 9,9-bis(4-hydroxyphenyl)fluorene. It is therefore not required to use a raw material such as an acid chloride, which therefore makes it possible to use a production method in which, essentially, no chlorine is contained, the amount of a catalyst can be decreased under reaction conditions at high temperature and the amount of a residual foreign matter is small.

For producing the polyester of the present invention by an ester exchange method of a melt polymerization method, the amount of the dihydroxy component of the general formula (1) is preferably 10 to 95 mol % based on the glycol component in the resin. When the above amount exceeds 95 mol %, there may be a problem in that the melt polymerization does not proceed or the polymerization takes an extremely long period of time. Although the above amount exceeding 95 mol % will cause the aforesaid problems in a production step, a polymer can be produced by a solution polymerization method or an interfacial polymerization method.

The polyester of the present invention may contain a lubricant, a heat-resisting agent, an antistatic agent, an ultraviolet light absorbent and a pigment as required for a molded end product.

When the polyester of the present invention is used for an optical material, it is preferred to take care so that dust is not included in the steps of polymerization, pelletizing the polymer, injection molding and molding the polymer in the form of a sheet or a film, including the step of feeding the raw materials. In this case, generally, when the polyester is used for producing a compact disk (to be referred to as CD hereinafter), it is preferred to have a class of 1,000 or less, and for information recording in a higher degree, it is preferred to have a class of 100 or less.

Being amorphous, the polyester of the present invention has features in that it is excellent in transparency and excellent in heat resistance since it has a glass transition temperature of at least 90° C., and further, that it is excellent in moldability since it has excellent melt viscoelasticity, so that residual stress strain and molecular orientation hardly take place, and even if these remain, it is almost free of optical anisotropy. Therefore, the polyester of the present invention is a resin which is very useful and suitable for a transparent material and an optical material.

A molded article from the polyester of the present invention can be obtained by any one of conventionally known methods such as an injection molding method, an injection compression molding method, a transfer molding method, a blow molding method, an extrusion molding method, a pressure molding method and a cast molding method. For a specific molding, a most suitable molding method may be selected from these. For example, an optical disk substrate, a lens and a general molded article are suitably produced by one of an injection molding method and an injection compression molding method, and a film, a sheet, an optical fiber and a fiber are suitably produced by an extrusion molding method. Further, for a bottle and a bag, a blow molding method is suitable, and for shape-forming, a pressure molding method and a transfer molding method are suitable. Above all, for obtaining a molded article required to have transparency, low optical anisotropy and heat resistance which are excellent properties of the polyester of the present invention, i.e., a molded article for optical use, an injection compression molding method and an extrusion molding method are preferred.

For producing an optical disk substrate which is one example of optical molded articles, an injection compression molding machine is suitable, and by properly setting the molding conditions such as resin temperature, mold temperature and retention pressure, there can be obtained an excellent optical disk substrate which has a small birefringence, which are uniform in birefringence, thickness and replication property in the diameter direction of the disk substrate and which is free of distortion. The above molding conditions cannot be generally determined since they differ depending upon a composition and a polymerization degree. However, the mold temperature is preferably a temperature 20° C. lower than a heat distortion temperature, and it is therefore from 70° C. to 130° C. The resin temperature is preferably from 270° C. to 360° C. When it is less than 270° C., the resin is poor in flowability and replication property, and a stress strain in a molding time remains to cause a large birefringence. When it exceeds 360° C., undesirably, the resin is liable to undergo thermal decomposition to cause a decrease in molded article strength or a coloring of a molded article, to stain a mirror surface of a mold or to degrade the mold releasability.

EXAMPLES

The present invention will be specifically explained hereinafter with reference to Examples. Each copolymer in Examples was measured for an intrinsic viscosity, a glass transition temperature, a birefringence and a total light transmittance as follows.

1. Intrinsic Viscosity

A copolymer in an amount of 0.15 to 0.5 g was dissolved in 50 ml of a mixed solution containing 60% by weight of phenol and 40% by weight of 1,1,2,2-tetrachloroethane at 80° C., and measured for a viscosity at 20° C.

2. Glass Transition Temperature

In a differential scanning calorimeter (Rigaku Denki DSC-8230), about 10 mg of a sample was heated &t a temperature elevation rate of 10° C./minute and measured. The glass transition temperature (Tmg) of the sample was determined according to the definition provided in JIS K7121-1987.

3. Birefringence

Measured through a Carl Zeiss polarization microscope attached with Selarmon, Belec and Brace Keller-type compensators at a 546 nm monochromatic light. The piece for the measurement was prepared by melting and extruding a resin at 260° to 300° C. to prepare a disk-shaped test piece having a diameter of 30 mm and a thickness of 1 mm, press-forming the so-prepared test piece at 160° to 240° C. to obtain a film having a thickness of 80 to 150 μm and cutting the film in a square form having a size of 4×40 mm. The pieces for the measurement was 40% stretched at a rate of 20%/second at a temperature of Tmg+10° C., and rapidly cooled to obtain a stretched film. This stretched film was measured for a birefringence.

4. NMR

A novel copolyester was measured with an FT-NMR apparatus supplied by Barian (300 MHZ). A sample was dissolved in a trifluoroacetic acid/chloroform mixed solvent (1:1), and tetramethylsilane was added as a standard for measuring the sample for a proton NMR spectrum.

5. Tensile Strength
Measured according to JIS K7113.
6. Tensile Modulus
Measured according to JIS K7113.
7. Tensile Elongation at Break
Measured according to JIS K7113.
8. Flexural Modulus
Measured according to JIS K7203.
9. Flexural Strength
Measured according to JIS K7203.
10. Izod Strength Measured according to JIS K7110. A test piece having a width of ½ inch was used.
11. Rockwell Hardness
Measured according to JIS K7202. M-scale was used.
12. Water Absorption Percentage
Dried at 100° C. for at least 10 hours, then immersed in ion-exchanged water at 23° C. for 24 hours and measured.
13. Refractive Index
Measured according to JIS K7105.
14. Total Light Transmittance
Measured according to JIS K7105.
15. Thermal Expansion Coefficient
Measured according to JIS K7197.
16. Specific Heat
Measured according to JIS K7123.
17. Thermal Deformation Temperature
Measured according to JIS K7207 under a load of 18.5 kgf/cm$^2$.
18. Specific Gravity
Measured with a pycnometer at 25° C.
19. Molding Shrinkage Percentage
A sample obtained by injection molding with a mold having a length of 178 mm, a width of 20 mm and a thickness of 3 mm. The ratio of a length of the molded article to the length of the mold was determined, and shown.
20. Heat Shrinkage Percentage
A ratio of change in a length found after the above test piece had been heat-treated at 80° C. for 48 hours was shown.

In the following Examples, "part" stands for part by weight.

Example 1

38 Parts of dimethyl terephthalate, 35 parts of 9,9-bis[4-(2-hydroxyethoxy)phenyl]fluorene and 27 parts of ethylene glycol were used as raw materials, and 0.042 part of calcium acetate was used as a catalyst. These were charged into a reactor, and gradually heated from 190° C. to 230° C. with stirring to carry out an ester exchange reaction according to a conventional method. A predetermined amount of methanol was drawn out of the system, and then, 0.012 part of germanium oxide as a polymerization catalyst and 0.033 part of trimethyl phosphate for preventing a coloring were added. The mixture were gradually temperature-increased and pressure-decreased, and while ethylene glycol which was generated was removed, the heating reactor was allowed to reach a temperature of 280° C. and a vacuum degree of 1 Tort or less. While these conditions were maintained, the reaction mixture was allowed to stand to increase the viscosity of the reaction mixture, and after a predetermined stirring torque was reached (after about 2 hours), the reaction was terminated. The reaction product was extruded into water to give pellets.

Table 1 shows the physical properties of the above copolymer. This resin was melt-molded at 290° C. to obtain a disk-shaped sample, and the sample was pressed at 220° C. to give a film having a thickness of 120 mm. When the film was stretched at 136° C., the stretched film showed a birefringence of 40×10$^{-4}$.

TABLE 1

| Items measured | Unit | Example 1 |
| --- | --- | --- |
| Refractive index [25° C.] |  | 1.619 |
| Glass transition temperature | °C. | 125 |

TABLE 1-continued

| Items measured | Unit | Example 1 |
| --- | --- | --- |
| Heat distortion temperature | °C. | 114 |
| Thermal expansion coefficient | $10^{-5}$ K$^{-1}$ | 7.1 |
| Specific heat | cal · °C.$^{-1}$ · g$^{-1}$ | 0.30 |
| Tensile modulus | $10^4$ kgf · cm$^{-2}$ | 2.6 |
| Tensile yield strength | kgf · cm$^{-2}$ | 673 |
| Elongation at tensile break | % | 9-21 |
| Flexural modulus | $10^4$ kgf · cm$^{-2}$ | 2.3 |
| Flexural strength | kgf · cm$^{-2}$ | 1,300 |
| Izod impact strength | kgf · cm$^{-2}$ | 4.4 |
| Rockwell hardness | | 66 |
| Specific gravity | g · cm$^{-3}$ | 1.27 |
| Water absorption percentage | % | 0.147 |
| Intrinsic viscosity | dl · g$^{-1}$ | 0.50 |
| Molding shrinkage percentage | % | 0.70 |
| Heat shrinkage percentage 80°C., 48 h. | % | 0.08 |

Example 2

Pellets were obtained in the same manner as in Example 1 except that the raw material composition was replaced with 26 parts of dimethyl terephthalate, 6 parts of 9,9-bis[4-(2-hydroxyethoxy)phenyl]fluorene and 18 parts of ethylene glycol, that the amount of calcium acetate was changed to 0.028 part, that the amount of germanium oxide was changed to 0.009 part and that the amount of trimethyl phosphate was changed to 0.022 part. The so-obtained polymer had an intrinsic viscosity of 0.43 and a glass transition temperature of 50° C.

The above polymer was melt-molded at 290° C. with a small injection molding machine to give a disk-shaped sample. The obtained plate was uniform and transparent. The plate was pressed at 250° C. to give a film having a thickness of 130 μm, and then the film was stretched at 161° C. to give a film which was uniform and transparent. The film was optically evaluated to show a birefringence of 20×10$^{-4}$.

Examples 3-6

Figure 1:
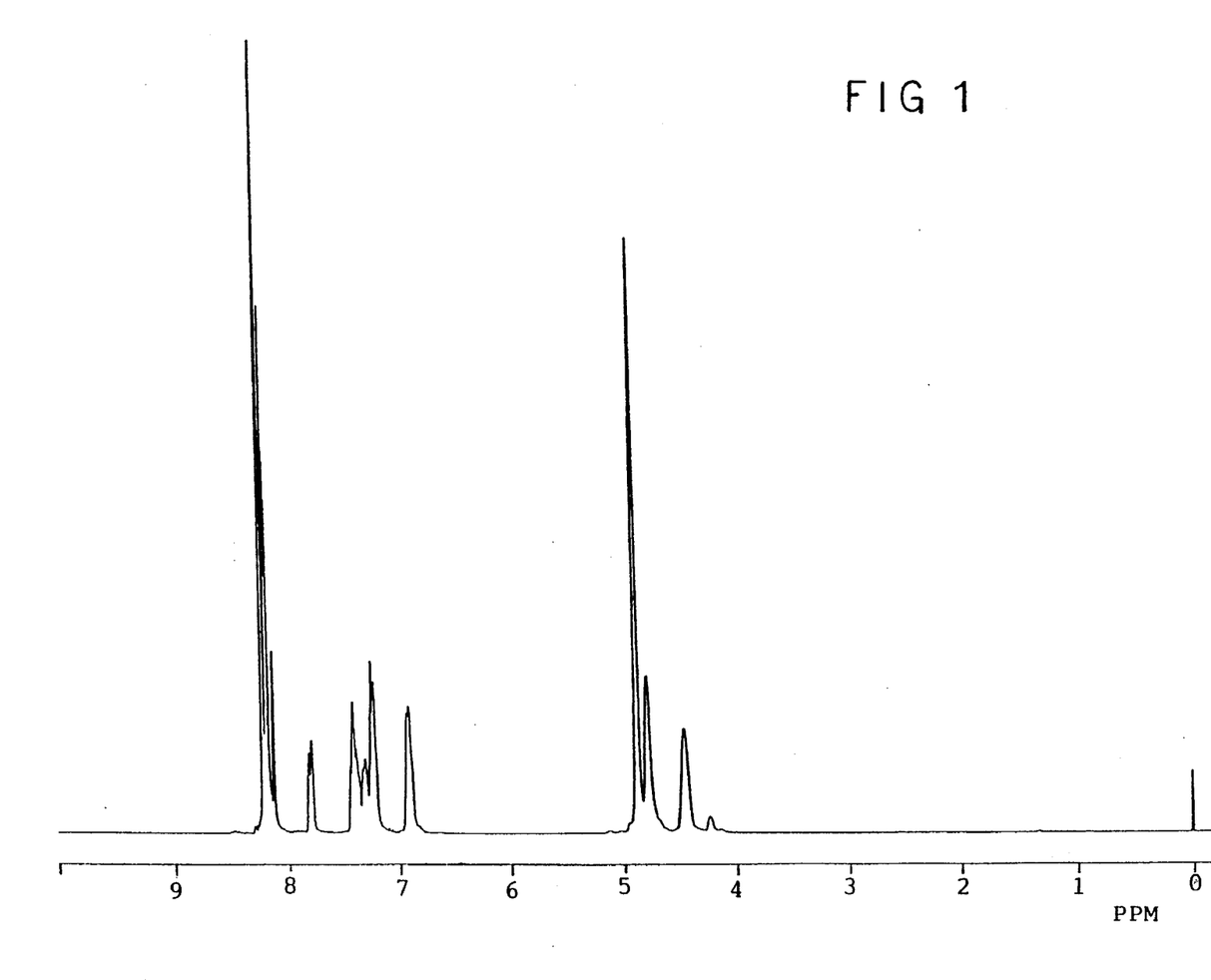
FIG. 1 is an NMR spectrum chart of a polyester of the present invention, obtained in Example 5.

Example 1 was repeated except that the raw material composition was changed, and Table 2 shows the results. All of the films which were obtained were uniform and transparent. FIG. 1 shows the NMR spectrum of the sample obtained in Example 5.

Comparative Example 1

Pellets were obtained in the same manner as in Example 1 except that the raw materials, etc., were replaced with 100 parts of dimethyl terephthalate, 25 parts of dimethyl isophthalate, 96 parts of ethylene glycol, 0.19 part of calcium acetate, 0.054 part of germanium oxide and 0.17 part of trimethyl phosphate. Table 2 shows the results of evaluations of this polymer. The polymer had a low Tmg, and was poor in heat resistance. Further, it was found that the polymer had a large birefringence and was not suitable for optical use.

Comparative Example 2

Example 1 was repeated except that ethanol and 9,9-bis(4-hydroxyphenyl)-fluorene in place of 9,9-bis[4-(2-hydroxyethoxy)phenyl]fluorene were used. No increase in the viscosity of the reaction mixture was observed, and even 4 hours after the polymerization was initiated, the viscosity did not increase. This substance was poured into water, while no pellets were formed. This substance are not usable for the extrusion molding or injection molding which the present invention intends to employ.

Comparative Example 3

Pellets were obtained in the same manner as in Example 1 except that the composition of the raw materials and additives were replaced with 100 parts of dimethyl terephthalate, 77 parts of ethylene glycol, 0.15 parts of calcium acetate, 0.043 part of germanium oxide and 0.13 part of trimethyl phosphate. Table 2 shows the physical properties of the so-obtained polymer. An attempt was made to form a film and evaluate it for a birefringence in the same manner, but the film was opaque and not measurable. This polymer can be used for special purposes, while it is not suitable for use requiring heat resistance and optical transparency, intended by the present invention.

Comparative Example 4

The reaction in Example 1 was terminated when the stirring torque was at a low point (about 30 minutes after the pressure reached 1 Torr), and the reaction product was extruded into water. However, no pellets were formed. This resin was measured for an intrinsic viscosity to show 0.25. Like those in Comparative Example 2, these pellets are not suitable for the object of the present invention.

Further, for another comparative example, a film was prepared from a commercially available polycarbonate (Novalex AD3, supplied by Mitsubishi Kasei Corporation), and evaluated for a birefringence, in the same manner as in Example 1. Table 2 shows the result. When Examples and Comparative Examples were compared, it was found that the products of the present invention were optically transparent, had a small birefringence and were excellent in heat resistance and moldability.

TABLE 2

| | Amount (part by weight) | | | | Intrinsic viscosity | Glass transition temperature (Tmg | Birefringence Stretched film |
| --- | --- | --- | --- | --- | --- | --- | --- |
| | Aromatic carboxylic acid | | Dihydroxy compound | | | | |
| | (A) | (B) | (a) | (b) | (dl/g) | °C.) | (10$^{-4}$) |
| Ex. 1 | 38 | — | 27 | 35 | 0.55 | 124 | 40 |
| Ex. 2 | 26 | — | 18 | 56 | 0.43 | 150 | 20 |

TABLE 2-continued

| | Amount (part by weight) | | | | Intrinsic viscosity (dl/g) | Glass transition temperature (Tmg °C.) | Birefringence Stretched film (10⁻⁴) |
|---|---|---|---|---|---|---|---|
| | Aromatic carboxylic acid | | Dihydroxy compound | | | | |
| | (A) | (B) | (a) | (b) | | | |
| Ex. 3 | 46 | — | 33 | 21 | 0.51 | 101 | 50 |
| Ex. 4 | 28 | — | 20 | 52 | 0.41 | 146 | 25 |
| Ex. 5 | 42 | — | 30 | 28 | 0.56 | 112 | 45 |
| Ex. 6 | 35 | — | 25 | 40 | 0.55 | 130 | 36 |
| CEx. 1 | 100 | 25 | 96 | — | 0.50 | 70 | 99 |
| CEx. 3 | 100 | — | 77 | — | 0.65 | 75 | Unmeasurable |
| Polycarbonate | — | — | — | — | 0.42 | 140 | 95 |

Ex. = Example, CEx. = Comparative Example
(A) Dimethyl terephthalate
(B) Dimethyl isophthalate
(a) Ethylene glycol
(b) 9,9-bis[4-(2-hydroxyethoxy)phenyl]fluorene

Examples 7–9

Example 1 was repeated except that 9,9-bis[4-(2-hydroxyethoxy)phenyl]fluorene was replaced with a 9,9-bis[4-(2-hydroxyethoxy)phenyl]fluorene derivative. Table 3 shows the results. These Examples show that the product of the present invention were optically transparent, had a small birefringence and were excellent in heat resistance and moldability.

TABLE 3

| | Amount (part by weight) | | | | | | Intrinsic viscosity (dl/g) | Glass transition temperature (Tmg °C.) | Birefringence Stretched film (10⁻⁴) |
|---|---|---|---|---|---|---|---|---|---|
| | Dimethyl terephthalate | Dihydroxy compound | | | | | | | |
| | | (a) | (b) | (c) | (d) | (e) | | | |
| Ex. 7 | 100 | 77 | — | 144 | — | — | 0.51 | 140 | 27 |
| Ex. 8 | 100 | 77 | — | — | 153 | — | 0.50 | 143 | 28 |
| Ex. 9 | 100 | 77 | — | — | — | 183 | 0.49 | 144 | 27 |

Ex. = Example
(a) Ethylene glycol
(b) 9,9-bis[4-(2-hydroxyethoxy)phenyl]fluorene
(c) 9,9-bis[4-(2-hydroxyethoxy)-3-methylphenyl]fluorene
(d) 9,9-bis[4-(2-hydroxyethoxy)-3,5-dimethylphenyl]fluorene
(e) 9,9-bis[4-(2-hydroxyethoxy)-3-phenylphenyl]fluorene

Examples 10–15

Example 1 was repeated except that an isophthalic acid component was used or added as an aromatic dicarboxylic acid component or that ethylene glycol or 1,4-butylene glycol was used as a diol component. Table 4 shows the results. In Examples using 1,4-butylene glycol, 0.01 part of tetrabutoxytitanium was used as an ester exchange catalyst, and these were charged into a reactor. The mixture was gradually heated from 140° C. to 200° C. with stirring according to a conventional method to carry out ester exchange. A predetermined amount of methanol was drawn out of the system, and then, 0.01 part of tetrabutoxytitanium as a polymerization catalyst and 0.03 part of triethyl phosphate for preventing a coloring were charged. The mixture was gradually temperature-increased and pressure-reduced, and while butylene glycol which was generated was removed, the heating reactor was allowed to reach a temperature of 250° C. and a vacuum degree of 1 Torr or less.

While these conditions were maintained, the reaction mixture was allowed to stand to increase its viscosity, and after a predetermined stirring torque was reached, the reaction was terminated. The reaction product was extruded into water to give pellets. These Examples showed that the products of the present invention were optically transparent, had a small birefringence and were excellent in heat resistance and moldability.

TABLE 4

| | Amount (part by weight) | | | | | | | |
|---|---|---|---|---|---|---|---|---|
| | Aromatic dicarboxylic acid | | Dihydroxy compound | | | | Intrinsic viscosity | Glass transition temperature | Birefringence Stretched film |
| | (A) | (B) | (a) | (b) | (c) | (d) | (dl/g) | (Tmg °C.) | (10⁻⁴) |
| Ex. 10 | — | 100 | 71 | — | 136 | — | 0.53 | 122 | 43 |
| Ex. 11 | 100 | 5 | 81 | — | 95 | — | 0.49 | 123 | 39 |
| Ex. 12 | 100 | 11 | 85 | — | 100 | — | 0.51 | 122 | 40 |
| Ex. 13 | 100 | — | — | 111 | 215 | — | 0.45 | 114 | 55 |
| Ex. 14 | 100 | — | — | 111 | 136 | 76 | 0.43 | 111 | 58 |
| Ex. 15 | 100 | — | — | 111 | 90 | — | 0.41 | 101 | 81 |

Ex. = Example
(A) Dimethyl terephthalate
(B) Dimethyl isophthalate
(a) Ethylene glycol
(b) 1,4-Butanediol
(c) 9,9-bis[4-(2-hydroxyethoxy)phenyl]fluorene
(d) 9,9-bis[4-(2-hydroxyethoxy)-3,5-dimethylphenyl]fluorene

Examples 16–18

Pellets were obtained in the same manner as in Example 1 except that the raw material composition was changed as shown in Table 5 including the replacement of dimethyl terephthalate with dimethyl 2,6-naphthalenedicarboxylate, that the catalyst, etc., were replaced with 0.16 part of manganese acetate, 0.034 of germanium oxide and 0.11 part of triethyl phosphate and that the heating reactor at the time of the final polymerization was allowed to reach a temperature of 290° C. and a vacuum degree of 1 Torr or less. Table 5 shows the results of evaluation of the polymers.

results. While an attempt was made to form a film for evaluating it for a birefringence, the film was opaque and unmeasurable. This polymer can be used for special purposes, while it is not suitable for use requiring heat resistance and optical transparency, intended by the present invention. When the above Examples and Comparative Example were compared, it was found that the products of the present invention were optically transparent, had a small birefringence and were excellent in heat resistance and moldability.

TABLE 5

| | Amount (part by weight) | | | | | | | | Glass | | |
|---|---|---|---|---|---|---|---|---|---|---|---|
| | Aromatic dicarboxylic acid | | | Dihydroxy compound | | | | Intrinsic viscosity | transition temperature | Birefringence Stretched film | |
| | (B) | (C) | (D) | (a) | (b) | (c) | (d) | (dl/g) | (Tmg °C.) | (10⁻⁴) | Remarks |
| Ex. 16 | — | 100 | — | 61 | — | 171 | — | 0.45 | 155 | 84 | the invention |
| Ex. 17 | — | 100 | — | 61 | — | 108 | 61 | 0.46 | 156 | 85 | the invention |
| Ex. 18 | 9 | 100 | — | 58 | — | 140 | — | 0.47 | 130 | 89 | the invention |
| Ex. 19 | — | — | 100 | 55 | — | 97 | — | 0.45 | 150 | 89 | the invention |
| CEx. 5 | — | 100 | — | 61 | — | — | — | 0.45 | 120 | Unmeasurable | other than the invention |

Ex. = Example, CEx. = Comparative Example
(B) Dimethyl isophthalate
(C) Dimethyl 2,6-naphthalenedicarboxylate
(D) Dimethyl 4,4'-biphenyldicarboxylate
(a) Ethylene glycol
(b) 1,4-Butanediol
(e) 9,9-bis[4-(2-hydroxyethoxy)phenyl]fluorene
(d) 9,9-bis[4-(2-hydroxyethoxy)-3,5-dimethylpheyl]fluorene

Example 19

Pellets were obtained in the same manner as in Example 16 except that dimethyl terephthalate was replaced with dimethyl 4,4'-biphenyldicarboxylate and that the raw material composition was changed as shown in Table 5. Table 5 shows the results of evaluation of the polymer.

Comparative Example 5

Example 16 was repeated except that ethylene glycol alone was used as a dihydroxy compound. Table 5 shows the

Examples 20–26

The polymer obtained in Example 1 was melted in an extruder at 290° C., then extruded into air with a gear pump having a predetermined output amount, solidified by cooling, and taken up at a rate of 300 m/minute to obtain an unstretched yarn. Then, the yarn was stretched with a horizontal stretching apparatus under conditions shown in Table 6. Besides those shown in Table, the stretching was carried out at temperature of 80°, 100° and 180° C. However, at 80° and 100° C., the yarn was whitened or broken so that no measurable yarn was obtained. At 180° C., the yarn was liable to be melted, and no sample was obtained.

The stretched yarns were measured for yarn properties with a Shopper's tester. Table 6 shows the results. These Examples show that the products of the present invention forms fibers which were optically transparent, had a small birefringence and had heat resistance.

TABLE 6

| | Stretching conditions | | Yarn properties | | |
|---|---|---|---|---|---|
| Sample No. | Stretch ratio | Stretching temperature °C. | De/Fil | Strength g/denier | Elongation % |
| Ex. 20 | 2.0 | 124 | 100/34 | 2.3 | 38.5 |
| Ex. 21 | 2.5 | " | 80/34 | 2.6 | 33.1 |
| Ex. 22 | 3.0 | " | 67/34 | 3.2 | 38.7 |

TABLE 6-continued

| | Stretching conditions | | Yarn properties | | |
|---|---|---|---|---|---|
| Sample No. | Stretch ratio | Stretching temperature °C. | De/Fil | Strength g/denier | Elongation % |
| Ex. 23 | 3.5 | " | 57/34 | 3.5 | 23.3 |
| Ex. 24 | 3.0 | 150 | 67/34 | 3.3 | 27.5 |
| Ex. 25 | 3.5 | " | 57/34 | 3.7 | 24.1 |
| Ex. 26 | 4.0 | " | 50/34 | 3.5 | 22.5 |

Ex. = Example

Example 27

A polyester having an intrinsic viscosity of 0.6 was obtained from the same composition as that used in Example 1 while the polymerization conditions were changed. This polymer was melted in a 25 mm-screw extruder at a resin temperature of 280° C. and extruded through a slit orifice to form a transparent sheet having a thickness of 1.2 mum. This sheet showed a total light transmittance of 91%, i.e., had excellent properties.

Examples 28–29

A polyester having an intrinsic viscosity of 0.5 was obtained from the same composition as that used in Example 1. This polymer was molded with an injection compression molding machine (DISK-III, supplied by Sumitomo Heavy Industries, Ltd.) with a nickel stamper having a groove having a width of 0.7 μm and a depth of 80 nm at intervals of 1.6 μm to form a mm disk. Table 7 shows the results.

The disk was measured for replication property with an interatomic power microscope SPI-3700 (supplied by Seiko Instruments Inc.). The replication property was calculated on the basis of a ratio of the groove depth of the substrate and the groove depth of the stamper.

The retardation was measured with an automatic birefringence measuring apparatus (ADR200B, supplied by Oak Seisakusho). The substrate which had been heat-treated at 100° C. for 2 hours was measured for a birefringence relative to perpendicular incidence and a retardation in the 30-degree slanting direction in each position of 25, 30, 35 and 40 mm distant from the center of the disk, and averages thereof are shown.

Comparative Example 6

A polycarbonate (Novalex AD3) supplied by Mitsubishi Kasei Corporation was molded into a disk with the same apparatus as that used in Examples 28 and 29.

TABLE 7

| | Resin temperature | Mold temperature | Total light transmittance (%) | Retardation (nm) | | | Replication property (%) |
|---|---|---|---|---|---|---|---|
| | | | | Perpendicular A | 30'-slanting B | Difference B-A | |
| Ex. 28 | 325 | 90 | 90 | +10 | +82 | 72 | 90 |
| Ex. 29 | 300 | 100 | 90 | +12 | +80 | 68 | 91 |
| CEx. 6 | 330 | 110 | 90 | −10 | +115 | 125 | 90 |

Ex. = Example, CEx. = Comparative Example

As clearly shown in Table 7, the products obtained in Examples are excellent in transparency and replication property and show small retardation in the perpendicular direction and the 30-degree slanting direction, and further, the difference therein is small. When the above Examples and Comparative Example were compared, it was found that the products of the present invention were optically transparent, had a small birefringence and were excellent in heat resistance and moldability.

EFFECT OF THE INVENTION

As described above, the polyester of the present invention is excellent in transparency and heat resistance, has small optical anisotropy, is excellent in moldability, dimensional stability and chemical resistance and is industrially suitable for use in the fields of optical materials, fibers, films and sheets.

We claim:

1. A polyester which is produced from an aromatic dicarboxylic acid as a main acid component, and a dihydroxy compound of the following formula (1), wherein $R_1$ is an alkylene group having 2 to 4 carbon atoms, and each of $R_2$, $R_3$, $R_4$ and $R_5$ is independently a hydrogen atom, an alkyl group having 1 to 4 carbon atoms, an aryl group or an aralkyl group, and an aliphatic glycol having 2 to 4 carbon atoms as main glycol components, and which has an intrinsic viscosity, measured in a phenol/tetrachloroethane mixed solvent at 20° C., of at least 0.3.

2. The polyester of claim 1, wherein the aromatic dicarboxylic acid is at least one aromatic dicarboxylic acid selected from terephthalic acid, isophthalic acid, naphthalenedicarboxylic acid and biphenyldicarboxylic acid.

3. The polyester of claim 1, wherein the dihydroxy compound of the general formula (1) is 9,9-bis[4-(2-hydroxyethoxy)phenyl]fluorene.

4. The polyester of claim 1, wherein the aliphatic glycol is ethylene glycol.

5. The polyester of claim 1, wherein the aliphatic glycol is butylene glycol.

6. The polyester of claim 1, wherein the molar ratio of the dihydroxy compound of the general formula (1): the aliphatic glycol having 2 to 4 carbon atoms is at least 10:90.

7. A molded article from the polyester of claim 1, which is a disk substrate, a lens, a sheet, a film, a tube or a fiber formed by injection molding, extrusion molding or compression molding.

\* \* \* \* \*

UNITED STATES PATENT AND TRADEMARK OFFICE
CERTIFICATE OF CORRECTION

PATENT NO. : 5 530 086
DATED : June 25, 1996
INVENTOR(S) : Michiaki FUJI et al

It is certified that error appears in the above-indentified patent and that said Letters Patent is hereby corrected as shown below:

On the title page, item [86]:

please correct the PCT No. as follows:

Change "PCT/JP93/01078" to ---PCT/JP93/01070---.

Signed and Sealed this

Twelfth Day of August, 1997

Attest:

BRUCE LEHMAN

*Attesting Officer*      Commissioner of Patents and Trademarks